(12) United States Patent
Crabtree et al.

(10) Patent No.: US 7,424,408 B1
(45) Date of Patent: Sep. 9, 2008

(54) AIRCRAFT ENGINE FACE RADAR CROSS SECTION ANALYSIS

(75) Inventors: Glenn David Crabtree, Oregonia, OH (US); James Mathias Boland, Cincinnati, OH (US); John D'Angelo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1826 days.

(21) Appl. No.: 09/610,094

(22) Filed: Jun. 30, 2000

(51) Int. Cl.
*G06F 7/60* (2006.01)
*G06F 17/15* (2006.01)
*G06G 7/48* (2006.01)
*G09B 9/08* (2006.01)
*G09B 9/05* (2006.01)

(52) U.S. Cl. .............. 703/2; 703/1; 703/5; 434/38; 434/69

(58) Field of Classification Search .............. 703/1, 703/2, 5; 434/38, 69
See application file for complete search history.

(56) References Cited

OTHER PUBLICATIONS

Akira Ahagon; Koji Fujiwara; Takayoski Nakata, "Comparison of Various Kinds of Edgw Elements for Electromagnect Field Analysis"; IEEE: Transactions on Magnetics, vol. 32, No. 3, May 3, 1996, pp. 898-901.*

"Electromagnetic Scattering and Radiation by Discrete Bodies of Revolution"; Robert Milton Sharple, MS. University of Houston, 1987;pp. vii-xi, 1-116.*

Brand-M.G.E. et al. "Comparison of RSC Prediction Techniques, Computations and Measurements". TNO Physics & Electron. Lab. (Nov. 1991). p. 39-42.*

Ross-D.C. et al. A Finite Element-Modal Technique for Scattering by Complex 3-D with a Plug and Play Numerical Scheme Combining IE, PDE, and Modal Technique. IEEE Jun. 1994, p. 1378-1381, vol. 3.*

Ross-D.C. et al. Hybrid Finite Element-Modal Analysis of Jet Engine Inlet Scattering. IEEE. vol. 43, Issue 3 (May 1995). p. 277-285.*

Ross-D.C. et al. Overlapping Geometric and Modal Symmetries in Jet Engine Scattering and Modulation. IEEE AP-S, Digets, vol. 1. (Jun. 1995). pp. 30-33.*

Barka-A. Scattering from 3-D Cavities with a Plug and Play Numerical Scheme Combining IE, PDE, and Modal Techniques. (May 2000). vol. 48, Issue 5, p. 704-712.*

Pathak-P.H. et al. "Modal, Ray and Beam Techicques for Analyzing the EM Scattering by Open-Ended Waveguide Cavities" (May 1989) Ohio State University vol. 37, Issue 5. p. 635-647.*

(Continued)

*Primary Examiner*—Albert DeCady
*Assistant Examiner*—Thomas H Stevens
(74) *Attorney, Agent, or Firm*—McNees Wallace & Nurick, LLC (57) ABSTRACT

An aircraft engine face radar cross section analysis is computed using a finite element based approach. A finite element model is only created for a periodic slice of the aircraft engine face. The system matrix of the finite element model is then transformed into a series of independent modes in a block diagonal matrix using a Discrete Fourier Transform. Each of the independent modes is then solved using an "infinite" pipe arrangement to remove the effects of rim scattering and the incident wave. The solved independent modes are summed together to determine the scattered electromagnetic field for the aircraft engine face. The scattered electromagnetic field is then used to calculate the radar cross section of the aircraft engine face.

20 Claims, 6 Drawing Sheets

OTHER PUBLICATIONS

Bedrosian-G et al. "Axiperiodic Finite Element Analysis of Generator End Regions Part II—Application". IEEE. (Dec. 1988). vol. 25, Issue 4. p. 3070-3072.*

Bedrosian-G et al. "Axiperiodic Finite Element Analysis of Generator End Regions Part I—Theory". IEEE. (Dec. 1988). vol. 25, Issue 4. p. 3067-3069.*

Lowther-D. "A Finite Element Technique for Solving 2-D Open Boundary Problems" (1978) IEEE. vol. 14, Issue 5. p. 467-469.*

Kameari-A-"Symmetric Second Ordfer Edge Elements for Triangle Tetrahedra". (1998). IEEE. vol. 35, Issure. 3. p. 1394-1397.*

Greenwood-A.D. et al. "A Novel Efficient Algorithm for Scattering from a Complex BOR using Mixed Finite Elements fand Cylindrical PML" (1999) IEEE vol. 47, Issue 4, p. 620-629.*

Bedrosian-G. et al. Axi-periodic Finite Element Analysis of Generator End Regions Part I-Theory. (1989) IEEE vol. 25, Issue 4. p. 3067-3069.*

NAS Technical Summaries. Mar. 1992—Feb. 1993 http://www.nas.nasa.gov/Pubs/TechSums/9293/Book.html. p. 1-13.*

Bain et al., "CFD Mixing Analysis of Jets Injected From Straight and Slanted Into Confined Crossflow in Rectangular Ducts" NASA Technical Memorandum 105699. 1992 p. 1-29.*

Bark et al., "An Efficient Algorithm for the RCS Modulation Prediction from Jet Inlet Engines" (1999)). IEEE p. 2566-2569.*

D' Angelo et al., ("A New Finite Element Formation for RFC Scattering by Complex Bodies of Revolution" (1993)). IEEE. p. 534-541.*

D'Angelo et al., "A New Finite Element Formulation for RF Scattering by Bodies of Revolution" 1993. p. 534-541.IEEE.*

Akira Ahagon; Koji Fujiwara; Takayoski Nakata, "Comparison of Various Kinds of Edge Elements for Electromagnetic Field Analysis"; IEEE: Transactions on Magnetics, vol. 32, No. 3, May 1996, pp. 898-901.

"Electromagnetic Scattering and Radiation by Discrete Bodies of Revolution"; Robert Milton Sharpe, MS. University of Houston, 1987; pp. vii-xi, 1-116.

* cited by examiner

AIRCRAFT ENGINE FACE RADAR CROSS SECTION ANALYSIS

BACKGROUND OF THE INVENTION

The present invention is related generally to performing radar cross section (RCS) analysis of aircraft engine face components. Specifically, the present invention is related to a finite element based approach for the capturing of fine details of RCS patterns from large scale, complex engine face configurations.

The performance of a radar cross section (RCS) analysis on aircraft engine face components is a prohibitively difficult task due to the large amount of memory required to generate an appropriate electromagnetic description of the aircraft engine face components (problems) to be analyzed. The RCS analysis of aircraft engine face components usually requires special numerical and mathematical techniques to be developed to make the large problems practically solvable. These special numerical and mathematical techniques need to include appropriate handling of complex multi-layer design features, modeling of the entire axi-periodic structure of the aircraft engine face components and techniques for coupling a finite domain to an infinite domain. The coupling of the finite domain to the infinite domain is usually accomplished using an integral boundary element technique.

Numerous techniques for solving large-scale electromagnetic problems are in common use. These techniques include Method of Moments (an integral equation technique), finite element and finite difference techniques (differential techniques) and geometrical and physical theory of diffraction based techniques (asymptotic techniques). Attempts to use these traditional techniques to perform RCS analysis of aircraft engine face components have proven to be largely unsuccessful. The current techniques in use require large amounts of computer memory and computational time to generate results on simple models that do not correspond to actual devices or scenarios with an aircraft engine face. The current techniques are essentially unworkable once they are applied to actual devices and scenarios because of the extraordinary amount of memory and computational time that is required to model the spatial volume and resolve the complex material and geometric details of the device.

Therefore what is needed in the art is a technique that can accurately perform an RCS analysis on actual aircraft engine face components without requiring large and excessive amounts of computer memory and computational time.

BRIEF SUMMARY OF THE INVENTION

The present invention is directed to a computer program product, a system and a method of calculating, in the frequency domain, a radar cross section of an aircraft component having an axi-periodic structure. The present invention will first create a finite element model (commonly called a mesh or a grid) for a preselected period of an axi-periodic aircraft component. Next, a system matrix of the finite element model is transformed using a Discrete Fourier Transform into a plurality of independent modes in a block diagonal matrix. Each independent mode is then solved to determine that portion of the total electromagnetic near-field contributed by each mode. The solving of each of the independent modes involves the use of an "infinite" pipe to remove the effects of rim scattering. The electromagnetic far-field is calculated, using a well known integral equation, from the electromagnetic near-field. The radar cross section for the aircraft component is then calculated, using a well known equation, from the electromagnetic far-field. Once the radar cross section for the aircraft component is determined, the aircraft component can be modified to achieve an optimal design.

One advantage of the present invention is that it can accurately capture fine details of RCS patterns from large scale, complex engine face configurations. Another advantage of the present invention is that it is effective in the analysis of conductive, coated and composite material configurations and can be used for multi-configuration, multi-frequency and multi-polarization analysis of aircraft engine components. Still another advantage of the present invention is that the RCS analysis is solvable in practical central processing unit (CPU) time in a desktop workstation-type environment. Yet another advantage of the present invention is that the RCS analysis can be used by an aircraft engine face designer to achieve, in a reasonable amount of time, a design with excellent RCS performance. Since the techniques accurately correlate to measured RCS values, the amount of time and prototype costs required to optimize designs is substantially reduced.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the figures to refer to the same parts.

DETAILED DESCRIPTION OF THE INVENTION

The present invention is directed to performing a computer simulation or analysis of the radar cross section (RCS) of aircraft engine face components. The computer simulation or analysis is performed in the frequency domain and can accurately model continuous wave behavior. The computer simulation or analysis can be executed on any general purpose computer having memory devices (RAM, ROM, hard disk, CD-ROM, etc.), processing units (CPU, ALU, etc.) and input/output devices (monitor, keyboard, mouse, printer, etc.). In a preferred embodiment of the present invention, the computer simulation or analysis is executed on a "desktop" computer or workstation. Preferably, the "desktop" workstation has a multi-processor arrangement, wherein the number of processors preferably range from 5 to 20. The multi-processor arrangement can execute instructions either serially or in parallel, as required, to achieve the most efficient processing of instructions. In another embodiment of the present invention, several "desktop" workstations or computers can be used in parallel to execute portions of the RCS computer simulation or analysis.

Figure 1:
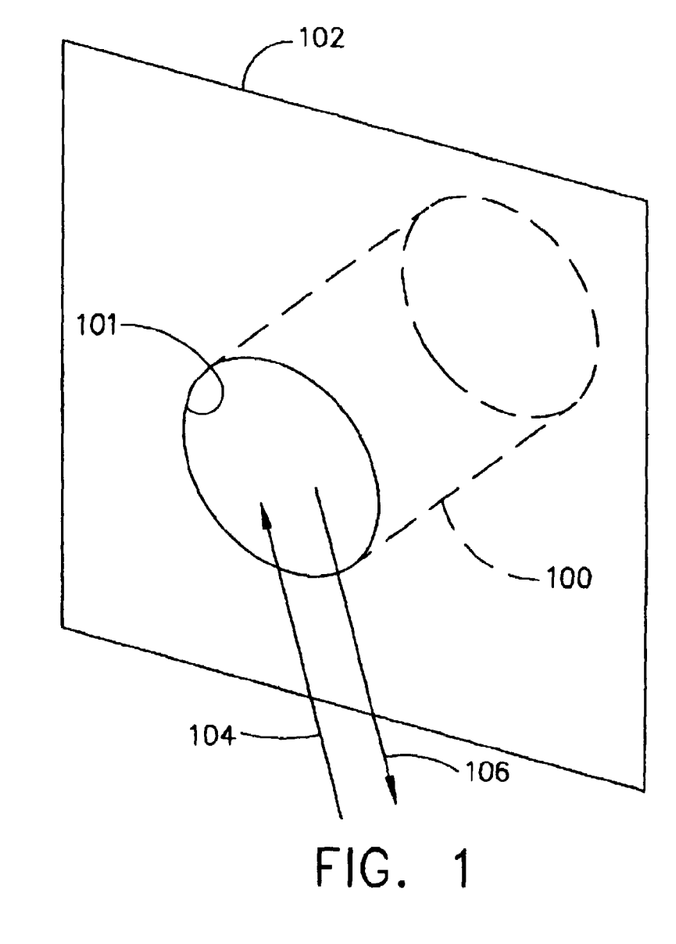
FIG. 1 illustrates the basic design model used for the computer analysis of the RCS of aircraft engine face components.

FIG. 1 illustrates the basic design model used for the computer simulation or analysis of the RCS of preselected aircraft engine face components. The aircraft engine face components are those engine components that are first struck by radar and include vanes and their corresponding assemblies, fans and their corresponding assemblies, engine frames, compressors or any other aircraft engine component having an axi-periodic structure. While the present invention is directed to the computer analysis or simulation of aircraft engine face components, it is to be understood that the computer simulation or analysis of the present invention can be applied to any aircraft component that has an axi-periodic structure.

The basic design model shown in FIG. 1 has a three-dimensional cavity 100, whose aperture 101 is in a particular plane in space 102 that intersects cavity 100. Within the cavity 100 is the aircraft engine face component or target (not shown), whose RCS is to be determined by the computer simulation. The computer simulation receives a mathematical representation of an incident wave 104 as an input at the aperture 101 of cavity 100. The incident wave 104 is a uniform plane wave or a transverse electromagnetic wave (TEM) impinged at a preselected angle and at a preselected frequency. Next, the computer simulation calculates the total electromagnetic field, the near-field, at the aperture 101 of the cavity 100. The total electromagnetic field is the sum of the incident wave 104 and the scattered waves 106 from the rim represented by the intersection of plane 102 and aperture 101, the cavity 100 and the preselected aircraft engine face component. The computer simulation then determines the scattered electromagnetic field for the aircraft engine face component by removing from the total electromagnetic field, the incident wave 104 and the scattered waves from the rim and cavity 100. The scattered electromagnetic field from the aircraft engine face component is then used as the basis for obtaining the RCS of the aircraft engine face component.

Figure 2:
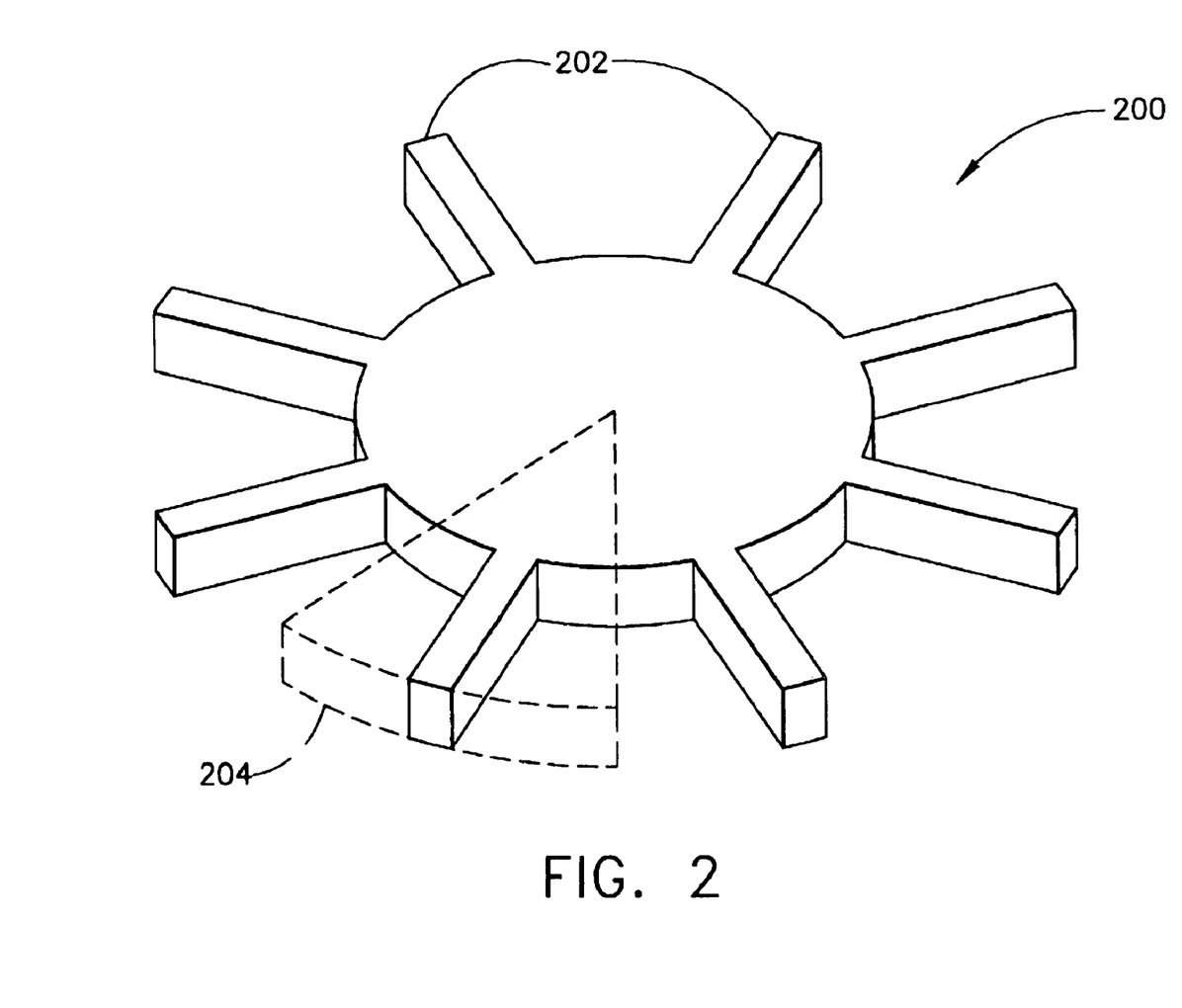
FIG. 2 illustrates the axi-periodic structure of an aircraft engine face component.

To begin the computer simulation or analysis, a finite element mesh is created of the preselected aircraft engine face component to be analyzed. The aircraft engine face components to be analyzed will preferably have an axi-periodic structure. In other words, there is a period, slice or portion of the aircraft engine face component that is repeatable around a central axis to form the entire aircraft engine face component. To further illustrate, FIG. 2 shows an aircraft engine face component 200 having eight vanes 202. The eight vanes 202 are spaced equally at 45 degree intervals about a central axis to cover an entire 360 degrees. This equal spacing of the eight vanes 202 permits any 45 degree slice 204 of the aircraft engine face component 200 to be repeated or placed next to itself seven additional times to form the aircraft engine face component 200. It should be noted that the aircraft engine face component 200 illustrated in FIG. 2 is meant to be illustrative and in no way limiting as to the type or structure of aircraft engine face component that can be analyzed by the present invention.

Since the preselected aircraft engine face component to be analyzed is an axi-periodic structure, a discrete body of revolution theory can be applied to the aircraft engine face component so that only a period or slice of the aircraft engine face component has to be modeled with finite elements. By modeling only a period or slice of the aircraft engine face component, the amount of memory required for the finite element model is greatly reduced. In addition, calculations based on the finite element mesh or model of the slice are as accurate as calculations based on a finite element mesh or model of the entire aircraft engine face component. In other words, the application of the discrete body of revolution technique reduces the computational effort but does not decrease the accuracy of the model.

The finite element model or mesh of the slice of the preselected aircraft engine face component will use sufficient finite elements to accurately resolve the incident waves 104 that strike the model or mesh. The size of the wave from crest to crest is called the wavelength and is inversely proportional to the frequency of the wave. The number of elements used in creating the finite element model for a required frequency of incident wave 104 may often result in a finite element model with unknown variables numbering as large as one million or more. The size of a finite element used in creating the model is smaller than the wavelength of any incident wave 104 that is striking the model, and is sometimes much smaller than the wavelength in order to resolve fine geometric detail. In a preferred embodiment, the finite elements created and used are three to four times smaller than the wavelength of the incident wave 104 that is striking the model or mesh. The finite elements used to create the mesh or model of the slice of the preselected aircraft engine face component preferably have a brick, prism or tetrahedron shape, although other shapes can be used for the finite elements. In one embodiment of the present invention, the finite elements used for the computer analysis are second order edge elements of the curl-conforming type. However, other orders (e.g. third order) and types of finite elements can be used to create the model or mesh. Material properties of the aircraft engine face component such as its $\mu$ (permeability) and $\epsilon$ (permittivity) can be accounted for in the governing equations. In addition, the governing equations can also account for the presence of R-cards or Z-cards that are thin sheets of material with conductive and dielectric properties that are placed on the aircraft engine face component. Finally, the use of finite elements permits the complex geometric structure of an aircraft engine face to be modeled with great fidelity.

In the analysis, the Discrete Fourier Transform technique is applied to reduce the large, sparse system of equations resulting from the finite element assembly (discretization) to a block diagonal sparse system of equations. The matrix size for a single block of the block diagonal sparse system is 1/N of the original system, where N is the number of periods. The number of Discrete Fourier modes used in the transformation directly corresponds to the number of periods or slices required to generate the entire aircraft engine face component. For example, using the slice 204 shown in FIG. 2, the slice 204 would have to be repeated or used an additional seven times for a total of eight to generate the entire preselected aircraft engine face component 200. Thus, applying a Discrete Fourier Transform to the system matrix for slice 204 would result in a block diagonal matrix having eight Discrete Fourier modes. Each Discrete Fourier mode in the block diagonal matrix represents a distinct portion of the electromagnetic field scattered by the entire preselected aircraft engine face component (360 degrees). Thus, the entire electromagnetic field in the cavity 100 is represented by the sum of the Discrete Fourier modes. Each Discrete Fourier mode is obtained from the solution of an independent block in the block diagonal matrix.

As discussed above, each Discrete Fourier mode represents a portion of the total electromagnetic field throughout the cavity 100 from the preselected aircraft engine face component. However, for compactness and computational efficiency, a system matrix called an "impedance matrix" or "super-element" that represents the unknowns at the aperture 101 of the cavity 100 is all that is required for further processing to obtain the RCS of the preselected aircraft engine face component. To obtain the impedance matrix at the aperture 101 of the cavity 100, each block is processed using a Back to Front solver. The Back to Front solver will process the unknowns in a block from the back (rear) of the cavity to the aperture 101 at the front of the cavity 100. During the progression from the aircraft engine face component to the aperture 101, the equations corresponding to unknowns in the intermediate layers are factored and then discarded because only the layer that corresponds to the aperture of the cavity 100 is necessary. At the end of this process, an impedance matrix for the unknowns on the aperture 101 of the cavity 100 is obtained. This impedance matrix accurately represents the response of the entire cavity 100 and the preselected aircraft engine face component to an impinging electromagnetic field or incident wave. One impedance matrix is obtained for each Discrete Fourier mode. The impedance matrix can also be called a "super-element" because it represents a finite element model of the entire cavity 100 and the preselected aircraft engine face component which can be repeatedly used for more than one analysis. This super-element is stored in computer memory or on hard disk drive storage for further processing to be described shortly.

To accurately represent the electromagnetic fields observed in the test environment, two additional tasks must be completed: the modeling of a zero duct length (ZDL) test fixture and the removal of the effects of the rim. These two additional tasks will be later combined with the cavity impedance matrix generated above to analyze the entire electromagnetic system.

The ZDL test fixture is an actual physical device in which the preselected aircraft engine face component is placed for measurement of the RCS from the aircraft engine face component. An impedance matrix for the ZDL test fixture has to be created for each Discrete Fourier mode of the computer simulation or analysis so that the RCS determined by the computer simulation corresponds to the actual test setup.

Figure 3A:
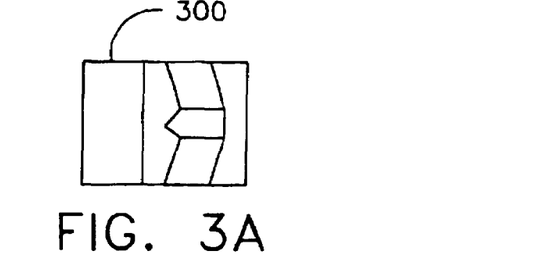
FIGS. 3A-3D illustrate schematically the steps involved in creating mathematical representations of pipes of preselected or "infinite" lengths.
Figure 3B:
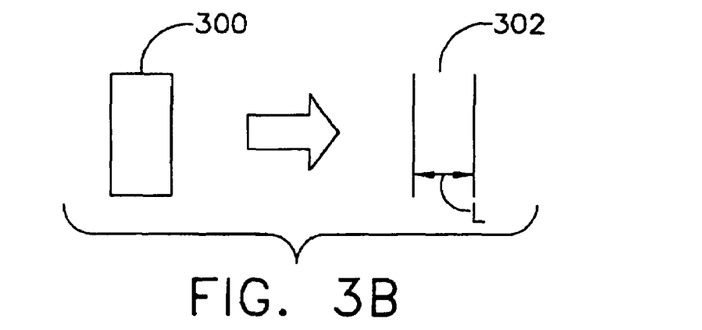
Figure 3C:
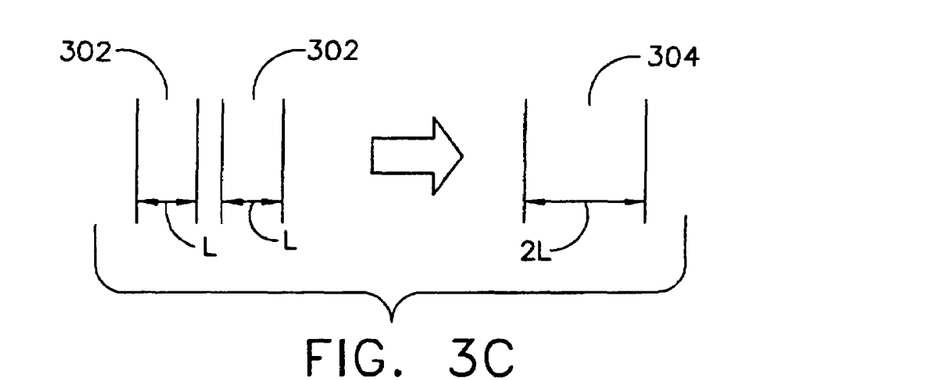
Figure 3D:
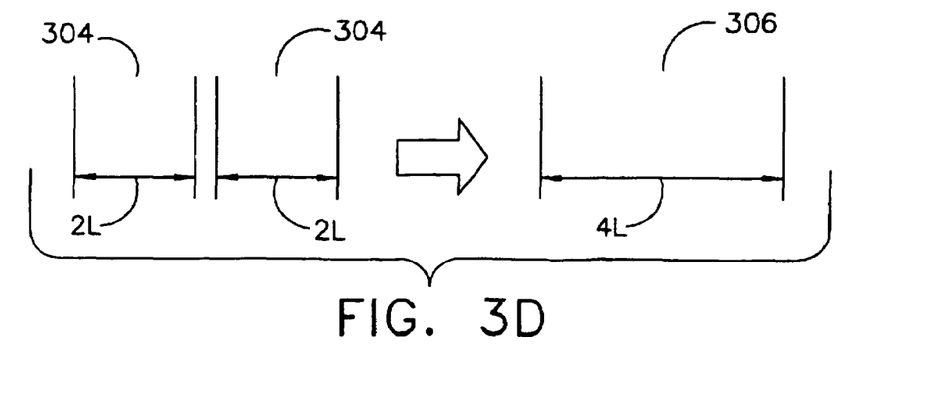

The steps in creating an impedance matrix that represents the ZDL test fixture are illustrated in FIGS. 3A-3D. As shown in FIG. 3A, the first step is to create a finite element model 300 of a preselected sublength L of the ZDL fixture and generate its resulting system matrix. Next, as illustrated in FIG. 3B, the ZDL system matrix is reduced into an impedance matrix 302 by eliminating the unknowns in the interior. The resulting impedance matrix 302 contains the unknowns on the two end surfaces of a ZDL test fixture of preselected sublength L. This impedance matrix 302 also includes the coupling information between unknowns on the two end surfaces. The process is continued recursively as shown in FIGS. 3C and 3D to obtain the impedance matrix for any finite length of the ZDL test fixture. In FIG. 3C, an impedance matrix 304 for the ZDL test fixture of length 2L is obtained by recursively adding two impedance matrices for the ZDL test fixture of length L and then reducing the resulting matrix to eliminate the interior unknowns. The process is then repeated, as shown in FIG. 3D, where the impedance matrix 304 is added to itself and then reduced into an impedance matrix 306 representing the two end surfaces of a ZDL test fixture of length 4L and the coupling information between unknowns on the two end surfaces. This process is repeated until the preselected length of the ZDL test fixture is achieved. Once the preselected length of the ZDL test fixture is achieved, this ZDL impedance matrix, or "super-element" is stored in computer memory or on the hard drive for later use. One impedance matrix for the ZDL test fixture is obtained for each Discrete Fourier mode.

An important aspect of the present invention is the construction and use of a "infinite pipe" to represent the electromagnetic fields extending from the cavity 100 containing the preselected aircraft engine face component and ZDL test fixture to very far distances. Without this infinite pipe representation, the fields would "bounce" or reflect back from artificially imposed structures in the numerical model, thus corrupting the solution and reducing the accuracy of the RCS computation. In other words, the infinite pipe eliminates the reflections from artificially imposed structures.

The infinite pipe is a numerical model of a very long pipe or cavity filled with an extremely low loss material to dampen the propagating electromagnetic field, thereby eliminating any reflection from the far end of the pipe. The infinite pipe starts with a system matrix from a finite element model of finite length, as was done with the ZDL model. Often, the ZDL super-element is used to model this first stage of the infinite pipe, although this is not necessary. The length of the infinite pipe is then recursively enlarged using the process described with regard to FIGS. 3C and 3D. As opposed to the process for creating the ZDL test fixture impedance matrix, the infinite pipe process is continued until the coupling terms between the unknowns on opposite surfaces of the infinite pipe impedance matrix or super-element are negligible. This process causes the opposite surfaces in the infinite pipe impedance matrix to become uncoupled. Only a few iterations are required because the length of the pipe grows rapidly as a function of $2^n$, where n is the recursive iteration number. Once completed, the terms containing unknowns on the far-side of the infinite pipe super-element are discarded. The near-surface terms of the infinite pipe super-element, i.e. the impedance matrix adjacent to the front surface of the ZDL, are then stored in computer memory or hard disk storage for later combination with the ZDL and cavity super-elements. Again, one infinite pipe impedance matrix or super-element is stored for each Discrete Fourier mode.

The impedance matrices or super-elements for the ZDL test fixture, the infinite pipe and the cavity are further processed to obtain the RCS of the aircraft engine face component. The processing of these super-elements or impedance matrices involves the coupling, complete elimination, factorization and solving of the matrices in a process to be described below. The construction of separate super-elements for different portions of the computer analysis or simulation process permits possible "swapping" of super-elements for an iterative design analysis. That is, storing the super-elements for future use can save computational time and effort when applied to other configurations.

Figure 4A:
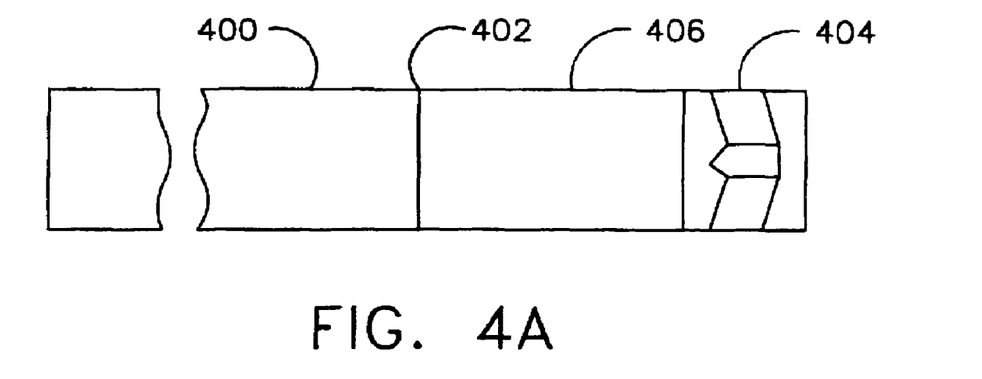
FIGS. 4A-4C illustrate schematically the steps used by the present invention to remove rim scattering effects.
Figure 4B:
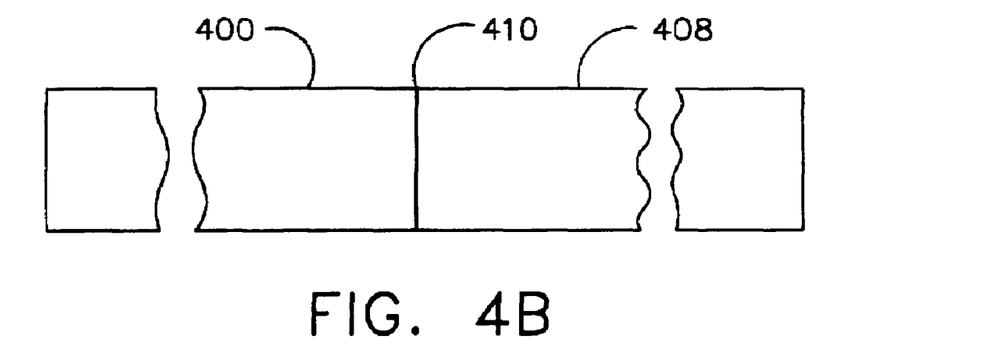
Figure 4C:
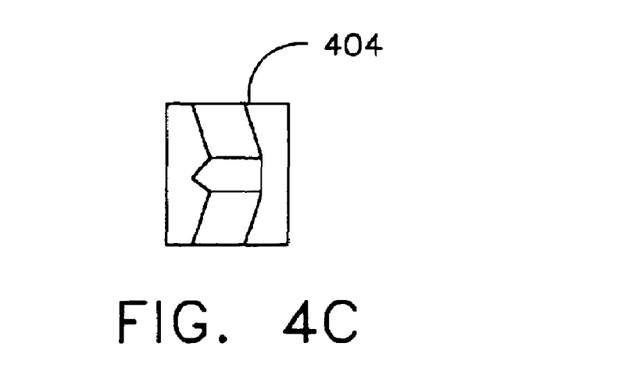

The process for calculating the RCS of an aircraft engine face component begins by determining the total electromagnetic field at the interface of the ZDL test fixture and infinite pipe. FIGS. 4A-4C illustrate schematically the process for determining the scattered electromagnetic field for an aircraft engine face component and for removing the effects of "rim" scattering. FIG. 4A illustrates the configuration for obtaining the total electromagnetic field for each Discrete Fourier mode. In FIG. 4A, the infinite pipe 400 is combined at interface or junction 402 with the cavity/aircraft engine face component 404 and the ZDL test fixture 406. The impedance matrices for the cavity/aircraft engine face component 404 and the ZDL test fixture 406 are coupled and the interior unknowns eliminated to generate a new impedance matrix representing both the cavity/aircraft engine face component 404 and the ZDL test fixture 406. The new impedance matrix representing both the cavity/aircraft engine face component 404 and the ZDL test fixture 406 is then coupled to the impedance matrix of the infinite pipe 400 to generate a final impedance matrix. The final impedance or system matrix for the configuration of FIG. 4A is then factored and solved using an incident plane wave of desired frequency and direction impinging at the interface 402 between the ZDL test fixture 406 and infinite pipe 400 and returns the total electromagnetic field (near-field) contributed by that Discrete Fourier mode.

The scattered electromagnetic field (near-field) contributed by a Discrete Fourier mode for the aircraft engine face component is then determined by subtracting the incident field from the calculated total field at interface 402. The scattered electromagnetic far-field contributed by a Discrete Fourier mode for the aircraft engine face component is then determined using a well known integral equation from the calculated near-field. The electromagnetic far-field is the electromagnetic field present at a substantial distance from the electromagnetic near-field. Finally, the RCS is determined using a well known equation from the sum of the scattered electromagnetic far-fields contributed by each Discrete Fourier mode. However, in using the configuration shown in FIG. 4A there is an electromagnetic field generated from the scattering of the incident wave from the rim or boundary between the ZDL test fixture 406 and the infinite pipe 400. To obtain an accurate computer analysis of the RCS of an aircraft engine face component, this rim scattering effect must be removed. The infinite pipe super element is used to remove the effects of rim scattering in a process described below.

As shown in FIG. 4B, a similar configuration is generated to the one in FIG. 4A. However, in FIG. 4B, the infinite pipe super-element is coupled to an identical infinite pipe super-element and processed as described above to obtain a final impedance matrix for the configuration. The second infinite pipe 408 represents a domain extending a large distance opposite the original infinite pipe 400 and replaces the ZDL test fixture 406 and cavity/aircraft engine face component 404 sections shown in FIG. 4A. The same incident plane wave used to solve the final system matrix for the configuration in FIG. 4A is impinged at the intersection 410 of the two infinite pipes. The final impedance matrix for the system of two-infinite pipes is solved, as described above, for the electromagnetic fields (near-fields) at 410 and then the electromagnetic far-fields are determined as described above. The rim scattering effect is then reduced to sufficiently low values by subtracting the far-fields from the two infinite pipe solution of FIG. 4B from the far-fields solution of FIG. 4A. This difference yields the scattered electromagnetic field for the aircraft engine face component 404 as shown in FIG. 4C. The RCS is then calculated from the remainder of these two subtracted solutions.

However, in another embodiment of the present invention, the rim scattering effect can be removed and the scattered electromagnetic field for the aircraft engine face component can be obtained by subtracting the electromagnetic near-field solution for the two infinite pipe solution of FIG. 4B from the electromagnetic near-field solution for the configuration of FIG. 4A. The scattered electromagnetic field (near-field) for each of the independent Discrete Fourier modes can then be added to determine the total scattered electromagentic near field. The total scattered electromagentic far-field is determined from the total scattered electromagnetic near-field. Finally, the RCS is determined from the total scattered electromagnetic far-field.

In another embodiment of the present invention, the use of conjugate mode symmetry can reduce the computational processing of the Discrete Fourier modes. Conjugate mode symmetry involves the use of primary modes and conjugate modes that are directly related to the primary modes. Conjugate mode symmetry permits the impedance matrices for certain modes to be reused for other modes. The impedance matrix for a conjugate mode is the transpose of the impedance matrix for the primary mode. Conjugate mode symmetry computations can reduce the number of required mode impedance matrices to (N+2)/2 (for odd values of N, eliminate the ½ remainder), where N is the original number of modes. For example, assume that an aircraft engine face component would generate five Discrete Fourier modes. Applying the conjugate mode theory to these five modes would result in the first mode being distinct, the fifth mode being a conjugate of the second mode and the fourth mode being a conjugate of the third mode, thereby reducing the total number of modes to be independently computationally processed to three. Thus, by using the conjugate mode theory not all of the modes have to be independently processed thereby significantly reducing the amount of computational time required to generate a solution.

After the RCS is calculated for the aircraft engine face component, changes can be made to the design of the aircraft engine face component to obtain an optimal RCS for the aircraft engine face component. Some of these changes can include a slight alteration of the material properties (e.g. $\mu$, $\epsilon$), the addition or removal of material treatments or a slight modification to the geometry of the aircraft engine face component. The computer simulation can then be executed again to obtain a new RCS value for the modified aircraft engine face component. This modification and re-execution process can be repeated until the optimal RCS value for an aircraft engine face component is obtained. Each new design configuration of the aircraft engine face component does not require new infinite pipe and ZDL test fixture super-elements to be created unless the number of Discrete Fourier modes is changed.

Figure 5:
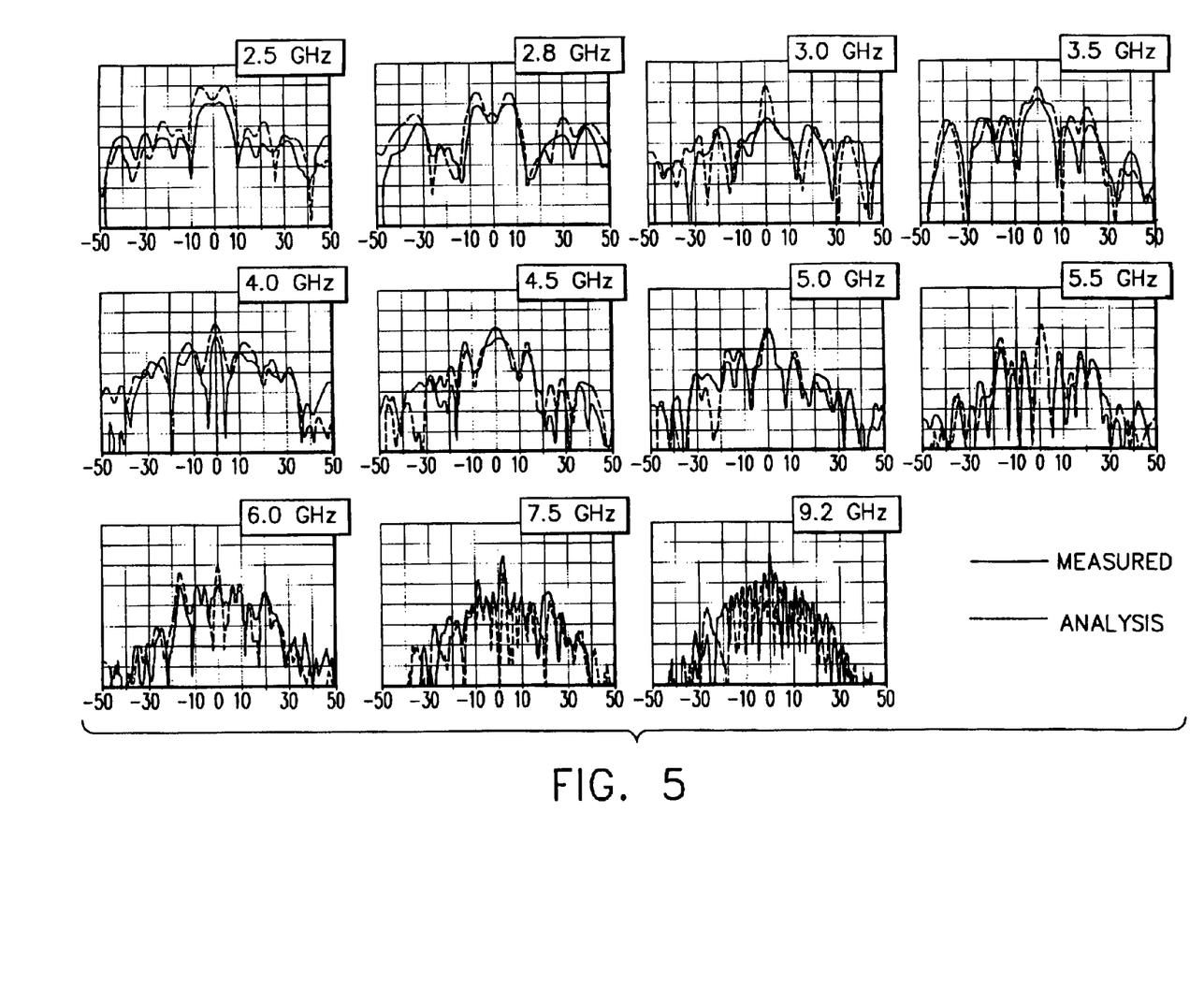
FIGS. 5 and 6 show a comparison between the RCS analysis of the present invention and the actual RCS measured for an aircraft engine face component.
Figure 6:
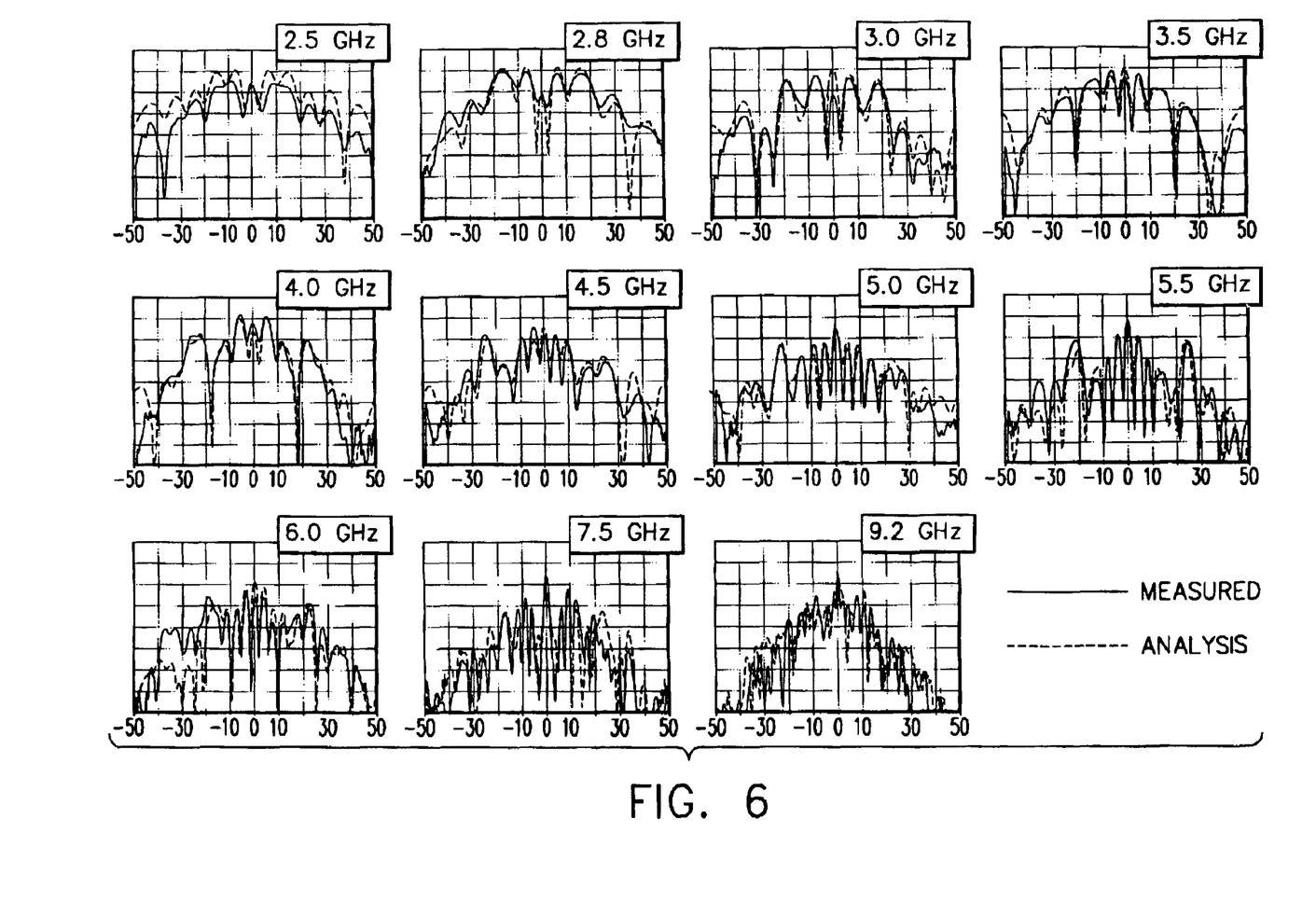

FIGS. 5 and 6 show a comparison of the RCS determined by the computer simulation of the present invention and the RCS measured using a ZDL test fixture for several different frequencies and polarizations. FIG. 5 show a comparison of measured and analyzed RCS values for different frequencies of incident waves. The incident waves used for the comparisons in FIG. 5 have an HH (horizontal) polarization and the ZDL test fixture has a thirty inch diameter. FIG. 6 also shows a comparison of measured and analyzed RCS values for different frequencies of incident waves. The incident waves used for the comparisons in FIG. 6 have a VV (vertical) polarization and the ZDL test fixture has a thirty inch diameter. As can be seen from FIGS. 5 and 6, the computer simulation of the present invention can accurately simulate what RCS will be measured for a particular aircraft engine face component in the ZDL test fixture.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of calculating a radar cross section of an aircraft component having an axi-periodic structure using a computer, comprising the steps of:

creating a finite element model using a computer for the aircraft component describing electromagnetic characteristics of the aircraft component;

transforming the finite element model using a computer into a plurality of independent modes;

determining, for each independent mode of the plurality of independent modes, a portion of an electromagnetic field contributed by each independent mode using a computer;

summing the portion of the electromagnetic field contributed by each independent mode of the plurality of independent modes using a computer to calculate a total electromagnetic field for the aircraft component; and determining the radar cross section for the aircraft component from the total electromagnetic field using a computer.

2. The method of claim 1 wherein said step of creating a finite element model for the aircraft component further comprises the step of creating a finite element model of a preselected period of the axi-periodic structure of the aircraft component.

3. The method of claim 2 wherein said step of transforming the finite element model into a plurality of independent modes further comprises the additional steps of:
   assembling a system matrix for the finite element model of the preselected period of the axi-periodic structure of the aircraft component; and
   applying a Discrete Fourier Transform to the system matrix.

4. The method of claim 1 wherein said step of creating a finite element model for the aircraft component further comprises the step of creating the finite element model using second order edge elements.

5. The method of claim 4 wherein the second order edge elements are curl conforming type elements.

6. The method of claim 1 wherein said step of determining, for each independent mode of the plurality of independent modes, a portion of an electromagnetic field contributed by each independent mode further comprises the additional steps of:
   creating a mathematical representation of a reference pipe having an infinite length; and
   using the mathematical representation of the reference pipe to determine the portion of the electromagnetic field contributed by each independent mode.

7. The method of claim 6 wherein said step of determining, for each independent mode of the plurality of independent modes, a portion of an electromagnetic field contributed by each independent mode further comprises the additional steps of:
   creating a mathematical representation of a test fixture;
   creating a mathematical representation of the aircraft component in a cavity;
   coupling the mathematical representation of the test fixture to the mathematical representation of the aircraft component to create a mathematical representation of a combination of the test fixture and the aircraft component;
   coupling the mathematical representation of the reference pipe to the mathematical representation of the combination of the test fixture and the aircraft component to create a mathematical representation of the reference pipe, the test fixture and the aircraft component having a common interface between the test fixture and the reference pipe; and
   solving the mathematical representation of the reference pipe, the test fixture and the aircraft component by introducing a mathematical representation of an incident wave at the common interface of the test fixture and the reference pipe.

8. The method of claim 7 wherein said step of creating a mathematical representation of a test fixture further comprises the additional steps of:
   creating a single layer of finite elements describing electromagnetic characteristics of the test fixture;
   assembling a system matrix for the single layer of finite elements;
   factoring the system matrix for the single layer of finite elements into a test fixture impedance matrix, wherein the test fixture impedance matrix represents end surfaces of the test fixture having a length; and
   doubling the length of the test fixture represented by the test fixture impedance matrix until a preselected length of test fixture is represented by the test fixture impedance matrix.

9. The method of claim 8 wherein said step of creating a mathematical representation of a reference pipe having an infinite length further comprises the additional steps of:
   copying the test fixture impedance matrix representing the test fixture of the preselected length to create a reference pipe impedance matrix, wherein the reference pipe impedance matrix represents end surfaces of the reference pipe having the preselected length; and
   doubling the length of the reference pipe represented by the reference pipe impedance matrix until a length of reference pipe is represented wherein the end surfaces of the reference pipe are uncoupled.

10. The method of claim 7 wherein the mathematical representation of the test fixture, the mathematical representation of the reference pipe and the mathematical representation of the aircraft component are each a super-element and the method further comprises the steps of:
    storing the super-elements for the test fixture, reference pipe and aircraft component in memory;
    modifying the aircraft component; and
    reusing stored super-elements for the test fixture and reference pipe to calculate a radar cross section for the modified aircraft component.

11. The method of claim 7 wherein said step of determining, for each independent mode of the plurality of independent modes, a portion of an electromagnetic field contributed by each independent mode further comprises the additional steps of:
    coupling the mathematical representation of the reference pipe to another identical mathematical representation of the reference pipe to create a mathematical representation of a two-sided reference pipe having a common interface;
    solving the mathematical representation of the two-sided reference pipe by introducing the incident wave at the common interface of the two reference pipes; and
    determining the difference between the solution of the representation of the reference pipe, test fixture and aircraft component and the solution of the representation of the two-sided reference pipe.

12. The method of claim 1 wherein the plurality of independent modes comprises primary modes and conjugate modes related to the primary modes and said step of determining, for each independent mode of the plurality of independent modes, the portion of an electromagnetic field contributed by each independent mode further comprises the additional steps of:
    determining an impedance matrix for each primary mode of the plurality independent modes; and
    determining an impedance matrix for each conjugate mode by transposing the impedance matrix of the corresponding primary mode for each conjugate mode.

13. A computer program product embodied on a computer readable medium and executable by a computer for calculating the radar cross section (RCS) of an aircraft engine face component, the computer program product comprising computer instructions for executing the steps of:
    creating a finite element model for the aircraft engine face component describing electromagnetic characteristics of the aircraft engine face component;
    transforming the finite element model into a plurality of independent modes;
    determining, for each independent mode of the plurality of independent modes, a portion of an electromagnetic field contributed by each independent mode;

summing the portion of the electromagnetic field contributed by each independent mode of the plurality of independent modes to calculate a total electromagnetic far-field for the aircraft engine face component; and determining the radar cross section for the aircraft engine face component from the total electromagnetic far-field.

14. The computer program product of claim 13 wherein the step of determining, for each independent mode of the plurality of independent modes, a portion of an electromagnetic field contributed by each independent mode further comprises the additional steps of:

creating a mathematical representation of a test fixture;

creating a mathematical representation of the aircraft engine face component in a cavity;

creating a mathematical representation of a reference pipe having an infinite length;

coupling the mathematical representation of the test fixture to the mathematical representation of the aircraft engine face component to create a mathematical representation of the combination of the test fixture and the aircraft engine face component;

coupling the mathematical representation of the reference pipe to the mathematical representation of the combination of the test fixture and the aircraft engine face component to create a mathematical representation of the reference pipe, the test fixture and the aircraft component having a common interface between the test fixture and the reference pipe; and solving the mathematical representation of the reference pipe, the test fixture and the aircraft engine face component by introducing a mathematical representation of an incident wave at the common interface of the test fixture and the reference pipe.

15. The computer program product of claim 14 wherein the step of determining, for each independent mode of the plurality of independent modes, a portion of an electromagnetic field contributed by each independent mode further comprises the additional steps of:

coupling the mathematical representation of the reference pipe to another identical mathematical representation of the reference pipe to create a mathematical representation of a two-sided reference pipe having a common interface;

solving the mathematical representation of the two-sided reference pipe by introducing the incident wave at the common interface of the two reference pipes; and determining the difference between the solution of the representation of the reference pipe, test fixture and aircraft engine face component and the solution of the representation of the two-sided reference pipe.

16. The computer program product of claim 13 wherein the aircraft engine face component has an axi-periodic structure and said step of creating a finite element model for the aircraft engine face component comprises an additional step of creating a finite element model of a preselected period of the axi-periodic structure of the aircraft engine face component using second order edge elements.

17. A system for calculating a radar cross section (RCS) of an aircraft engine component comprising:

a computer having memory and a processing unit;

means for creating a finite element model for the aircraft engine component describing electromagnetic characteristics of the aircraft engine component;

means for transforming the finite element model into a plurality of independent modes;

means for determining, for each independent mode of the plurality of independent modes, a portion of an electromagnetic near-field contributed by each independent mode; and means for summing the portion of the electromagnetic near-field contributed by each independent mode of the plurality of independent modes to calculate a total electromagnetic near-field for the aircraft engine component;

means for determining a total electromagnetic far-field for the aircraft engine component from the total electromagnetic near-field for the aircraft engine component; and means for determining the radar cross section for the aircraft engine component from the total electromagnetic far-field.

18. The system of claim 17 wherein:

the aircraft engine component has an axi-periodic structure;

said means for creating a finite element model for the aircraft engine component further comprises:

means for creating a finite element model of a preselected period of the axi-periodic structure of the aircraft engine component; and said means for transforming the finite element model into a plurality of independent modes further comprises:

means for assembling a system matrix for the finite element model of the preselected period of the axi-periodic structure of the aircraft engine component; and means for applying a Discrete Fourier Transform to the system matrix.

19. The system of claim 17 wherein said means for determining, for each independent mode of the plurality of independent modes, a portion of an electromagnetic near-field contributed by each independent mode comprises:

means for creating an impedance matrix for a test fixture;

means for creating an impedance matrix for the aircraft engine component in a cavity;

means for creating an impedance matrix for a reference pipe having an infinite length;

means for coupling the impedance matrix for the test fixture to the impedance matrix for the aircraft engine component to create an impedance matrix for the combination of the test fixture and the aircraft engine component;

means for coupling the impedance matrix for the reference pipe to the impedance matrix for the combination of the test fixture and the aircraft component to create an impedance matrix for the reference pipe, the test fixture and the aircraft engine component having a common interface between the test fixture and the reference pipe; and means for solving the impedance matrix for the reference pipe, the test fixture and the aircraft engine component by introducing a mathematical representation of an incident wave at the common interface of the test fixture and the reference pipe.

20. The system of claim 17 wherein said means for determining, for each independent mode of the plurality of independent modes, a portion of a electromagnetic near-field contributed by each independent mode further comprises:

means for coupling the impedance matrix for the reference pipe to another identical impedance matrix for the reference pipe to create an impedance matrix for a two-sided reference pipe having a common interface;

means for solving the impedance matrix for the two-sided reference pipe by introducing a incident wave at the common interface of the two reference pipes; and means for determining the difference between the solution of the impedance matrix for the reference pipe, test fixture and aircraft engine component and the solution of the impedance matrix for the two-sided reference pipe.

* * * * *